US010295946B2

(12) United States Patent
Testardi

(10) Patent No.: US 10,295,946 B2
(45) Date of Patent: May 21, 2019

(54) WARRANTY ENTITLEMENT OF IMAGE-FORMING DEVICE CONSUMABLE ITEM

(76) Inventor: Stephen L. Testardi, Boise, ID (US)

( * ) Notice: Subject to any disclaimer, the term of this patent is extended or adjusted under 35 U.S.C. 154(b) by 3013 days.

(21) Appl. No.: 11/831,811

(22) Filed: Jul. 31, 2007

(65) Prior Publication Data
US 2009/0037199 A1 Feb. 5, 2009

(51) Int. Cl.
G06Q 30/00 (2012.01)
G03G 15/00 (2006.01)
G03G 15/08 (2006.01)

(52) U.S. Cl.
CPC ......... *G03G 15/55* (2013.01); *G03G 15/0863* (2013.01); *G03G 15/5075* (2013.01); *G06Q 30/012* (2013.01); *G03G 15/553* (2013.01); *G03G 2215/0697* (2013.01)

(58) Field of Classification Search
USPC ........................................ 705/302
See application file for complete search history.

(56) References Cited

U.S. PATENT DOCUMENTS

| 5,894,596 | A | * | 4/1999 | Hayes, Jr. ................. 455/418 |
| 5,930,553 | A | * | 7/1999 | Hirst et al. .................... 399/8 |
| 6,018,719 | A | * | 1/2000 | Rogers et al. ............... 705/24 |
| 6,085,172 | A | * | 7/2000 | Junger ........................ 705/28 |
| 6,163,693 | A | * | 12/2000 | Rydbeck ................... 455/418 |
| 6,208,853 | B1 | * | 3/2001 | LoVasco et al. ......... 455/414.1 |
| 6,227,643 | B1 | | 5/2001 | Purcell et al. |
| 6,519,470 | B1 | | 2/2003 | Rydbeck |
| 6,535,697 | B2 | | 3/2003 | Reihl et al. |
| 6,661,978 | B2 | | 12/2003 | Brewington |
| 6,965,866 | B2 | | 11/2005 | Klein |
| 7,047,565 | B2 | * | 5/2006 | Piazza et al. ................ 726/26 |
| 2002/0165725 | A1 | * | 11/2002 | Heusinkveld ................ 705/1 |
| 2003/0018578 | A1 | | 1/2003 | Schultz |
| 2003/0074294 | A1 | * | 4/2003 | Merkin et al. ............. 705/36 |
| 2004/0181310 | A1 | * | 9/2004 | Stashluk et al. ........... 700/226 |
| 2005/0251480 | A1 | * | 11/2005 | Lyman ......................... 705/50 |

FOREIGN PATENT DOCUMENTS

WO 2006031724 A2 3/2006

OTHER PUBLICATIONS

An Overview of Cryptographic Hash Functions and their uses, John Edward Silva, SANS Institute, Jan. 2003 (Year: 2003).*
International Search Report dated Feb. 9, 2009 for International application No. PCT/US2008/071779, filing date Jul. 31, 2008.

* cited by examiner

Primary Examiner — Dennis W Ruhl
(74) Attorney, Agent, or Firm — Michael A Dryja

(57) ABSTRACT

A first computer program generates a code encoding a date when the code was generated, an at least substantially unique identifier of a consumable item for an image-forming device, and usage information regarding the consumable item. The at least substantially unique identifier and the usage information are retrieved from a memory of the consumable item. Upon a user returning the consumable item for warranty purposes, a second computer program decodes the code to obtain the date, the at least substantially unique identifier, and the usage information. The second computer program determines whether to entitle the consumable item for warranty purposes based on the date, the at least substantially unique identifier, and the usage information. The second computer program outputs whether the consumable item should be entitled for warranty purposes.

15 Claims, 3 Drawing Sheets

WARRANTY ENTITLEMENT OF IMAGE-FORMING DEVICE CONSUMABLE ITEM

BACKGROUND

Determining whether to entitle a product for warranty purposes means determining whether the user returning the product for warranty purposes satisfies any and all constraints imposed by the terms of the warranty in question. Furthermore, an image-forming device consumable item is a consumable item that is used by an image-forming device to form images on sheets of media and that is normally periodically replaced by the user. For example, such a consumable item may be an inkjet cartridge where the image-forming device is an inkjet-printing device, or a toner cartridge where the image-forming device is a laser-printing device. Determining whether to entitle an image-forming device consumable item for warranty purposes desirably includes verifying that the user has not tampered with the consumable item to fraudulently receive a replacement consumable item under warranty.

DETAILED DESCRIPTION OF THE DRAWINGS

Figure 1:
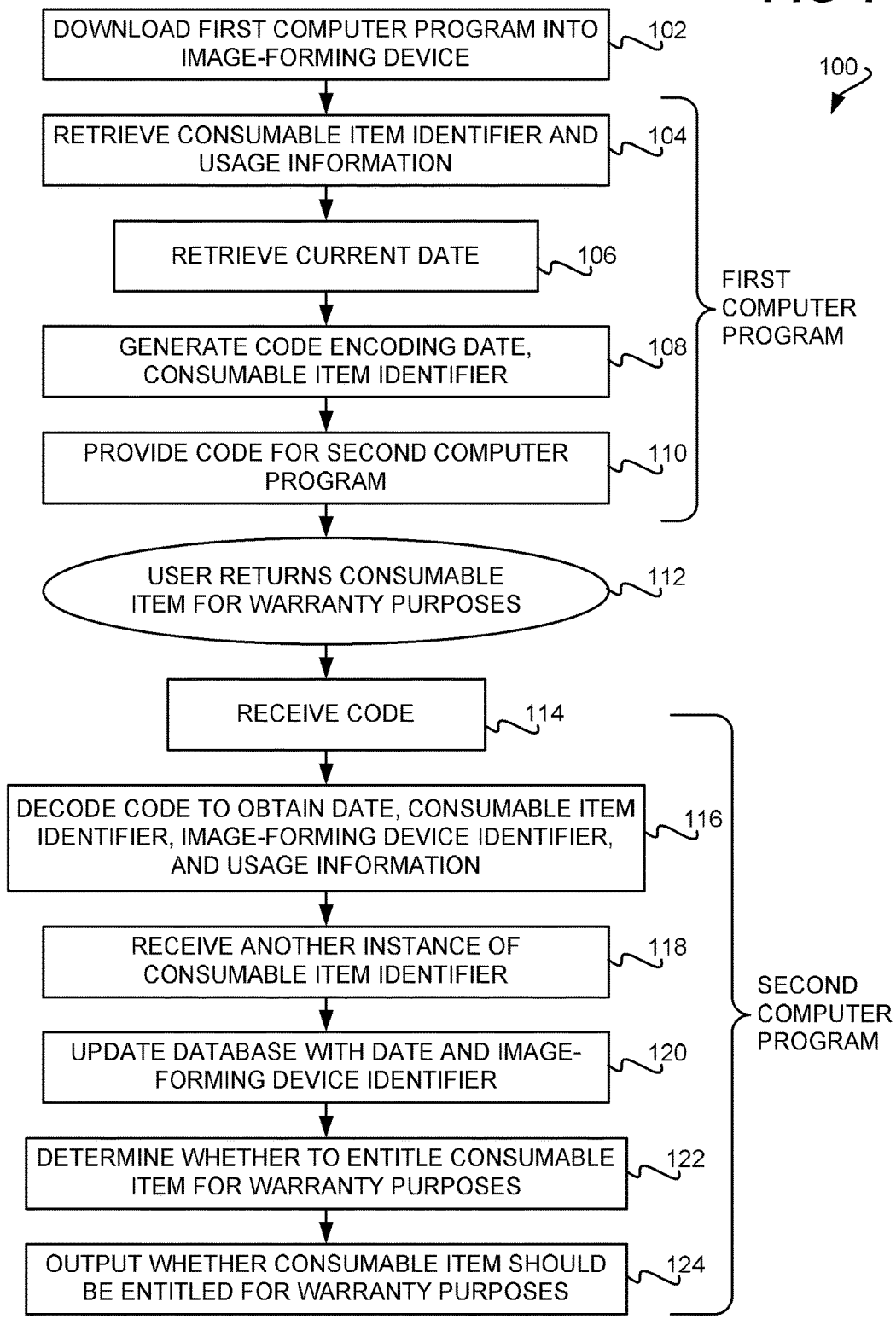
FIG. 1 is a flowchart of a method for performing a warranty entitlement process for an image-forming device consumable item, according to an embodiment of the present disclosure.

FIG. 1 shows a method 100 for performing a warranty entitlement process for a consumable item for an image-forming device, according to an embodiment of the present disclosure. The image-forming device may be a laser-printing device, an inkjet-printing device, or another type of image-forming device. The consumable item may be an inkjet cartridge, a toner cartridge, or another type of image-forming device consumable item. The image-forming device uses the consumable item to form images on sheets of media like paper. For instance, the image-forming device may eject ink supplied by a consumable item to form images on media sheets. As another example, the image-forming device may apply and fuse toner supplied by a consumable item to form images on media sheets.

As depicted in FIG. 1, the method 100 is substantially performed by two computer programs. The first computer program performs parts 104, 106, 108, and 110 of the method 100, whereas the second computer program performs parts 114, 116, 118, 120, 122, and 124 of the method 100. The first computer program can be performed by the image-forming device itself, or in another embodiment, by a computing device to which the image-forming device is communicatively connected. By comparison, the second computer program can be performed by a computing device at a location at which a user of the consumable item is attempting to return the consumable item under warranty.

In one embodiment, the method 100 downloads the first computer program into the image-forming device (102). In this embodiment, the image-forming device is not shipped for purchase and/or usage by the user with the first computer program already installed. Rather, the image-forming device downloads the first computer program over a network from a computing device, like a web server operated by or for the manufacturer of the image-forming device.

Downloading the first computer program into the image-forming device is inclusive of running the first computer program cooperatively between the image-forming device and such a web server via execution of a small computer program known as a web applet. In such instance, the first computer program is substantially executed by the web server, but at least some parts may be considered as running on the image-forming device, such as those aspects that retrieve information regarding the image-forming device or the consumable item that has been inserted into the image-forming device.

In another embodiment, however, the image-forming device may be shipped for purchase and/or usage by the user with the first computer program already installed. In either case, the first computer program retrieves an at least substantially unique identifier of the consumable item, and usage information regarding the consumable item (104). This information may be retrieved from a memory, such as a non-volatile memory, that is part of the consumable item itself, and that is updated as the consumable item is depleted or used by the image-forming device to form images on media. For instance, the usage information may include the number of sheets of media on which images have been formed by using the consumable item.

The usage information may also include whether the rated life of the consumable item has been exceeded or not, as well as the average sheet coverage of the consumable material supplied by the consumable item on the sheets of media on which images have been formed by using the consumable item. For example, a five-percent average sheet coverage means that, on average, five percent of each sheet of media on which images have been formed by using the consumable item were covered by the consumable material supplied by the consumable item. The consumable material in this case may be toner, ink, or another type of consumable material.

The consumable item identifier is an at least substantially unique identifier, in that it at least substantially uniquely identifies the consumable item as compared to other consumable items of the same type or kind. The at least substantially unique identifier of the consumable item may be a serial number of the consumable item. In this instance, the identifier is in fact likely to be completely unique, since serial numbers are desirably not repeated. In another embodiment, the at least substantially unique identifier of the consumable item may be sufficiently unique, in that it is likely to identify the consumable item as compared to most other consumable items of the same kind, but may not be completely unique, in that one or more other consumable items of the same kind may have the same identifier. An example of such an identifier is a lot number that specifies when the consumable item in question was manufactured, and where the item was manufactured. For the remainder of this patent application, the terminology "consumable item identifier" is used as shorthand to mean an at least substantially unique identifier of the consumable item.

The first computer program also retrieves the current date (106). The current date may be the date, and may include the time, that an internal time clock of the image-forming device itself currently reflects, or as that which an internal time clock of a computing device to which the image-forming device is (directly) communicatively connected currently reflects. However, in another embodiment, the current date may be retrieved from a computing device, such as a time server, over a network. The latter embodiment may be advantageous where users are suspected of modifying the time clocks of their image-forming devices and/or computing devices to reflect the wrong date.

The first computer program then generates a code encoding the date at which the code is being generated, the consumable item identifier, an image-forming device identifier, and the usage information regarding the consumable item (108). In one embodiment, one or more of these pieces of information may be omitted. For example, the image-forming device identifier may be omitted. The image-forming device identifier is an at least substantially unique identifier, such as a serial number or a lot number, that at least substantially uniquely identifies the image-forming device as compared to other image-forming devices of the same type or kind. For the remainder of this patent application, the terminology "image-forming device identifier" is used as shorthand to mean an at least substantially unique identifier of the image-forming device.

The date that is encoded within the code is the current date that was retrieved in part 104 by the first computer program. Furthermore, the code is desirably generated cryptographically. For instance, the user desirably does not know and cannot easily learn the algorithm by which the code is generated. Likewise, the user may not be able to easily determine the information encoded within the code by inspecting the code that is generated. As such, the code is resistant to forgery or other attempts to thwart the integrity of the code.

In one embodiment, the code may be generated by using a hash algorithm, such that the code is considered as being one or more hash values. The code may additionally or alternatively be generated as a two-dimensional or three-dimensional barcode, a glyph, or another type of indicia. For example, the hash values that encode the date, the consumable item identifier, the image-forming device identifier, and the usage information may be a string of alphanumeric characters, which are then converted to a bar code, a glyph, or another type of indicia.

The first computer program then provides the code as has been generated for inspection by the second computer program (110). In one embodiment, the first computer program may form an image on a sheet of media, where the code is part of the image. In another embodiment, the first computer program may transmit the code to a server or other type of computing device over a network. For instance, this server may be operated by or for the manufacturer of the consumable item.

Once parts 102, 104, 106, 108, and/or 110 have been performed, the user can then return the consumable item for warranty purposes (112). For example, the user may be asserting that the consumable item is defective in some way, such that he or she desires a replacement consumable item under warranty. The user may ship the consumable item to a return center, the user may return the consumable item to the store from which he or she purchased it, or the user may return the consumable item to a return center in person, among other types of modes by which returns can be performed.

The second computer program is then executed by performing parts 114, 116, 118, 120, 122, and/or 124 of the method 100. The second computer program first receives the code that has been generated and provided by the first computer program (114). Where the code is part of an image formed on a sheet of media, the code may be optically scanned so that it can received by the second computer program. Where the code has been transmitted to a server or other type of computing device over a network, the second computer program may receive the code from this server or other type of computing device, also over the network.

The second computer program then decodes the code to obtain the date at which the code was generated, the consumable item identifier, the image-forming device identifier, and/or the usage information regarding the consumable item (116). The second computer program and the first computer program are written or developed so that they use complementary encoding and decoding algorithms. For example, the first computer program may use a particular type of hash algorithm to generate hash values that are then converted to a particular type of barcode. The second computer program thus converts the barcode back to the hash values in the complementary manner, and uses a complementary hash algorithm to retrieve the information encoded within the hash values from the hash values.

The second computer program also receives another instance of the consumable item identifier (118). This other instance of the consumable item identifier is referred to as such to differentiate it from the consumable item identifier that was decoded from the code in part 116. For instance, the housing of the consumable item that is the subject of a return for warranty purposes may have its substantially unique identifier imprinted thereon. Where the consumable item identifier is imprinted on the consumable item in a human-readable form, such as via a series of alphanumeric characters, an operator of the second computer program may enter these alphanumeric characters into the second computer program. Where the consumable item identifier is imprinted on the consumable item in an indicia fashion, such as a barcode or a glyph, an optical scanner or reader may be employed to input this other instance of the consumable item identifier into the second computer program.

In one embodiment, the second computer program may update a database with an entry corresponding to the decoded date and the decoded image-forming device identifier (120), where the image-forming device identifier was decoded from the code in part 116. The database may be a centralized database maintained by or for the manufacturer. As such, updating the database may include sending the information by the second computer program to a database server over a network, where the database server then adds an entry to the database that corresponds to the decoded date and the decoded image-forming device identifier. The purpose of updating such a database in this manner is so that the number of returns of consumable items that were installed or inserted in the same image-forming device over various periods of time can be tracked.

The second computer program determines whether to entitle the consumable item for warranty purposes, based on the information previously decoded from the code (122). That is, the second computer program determines whether the user returning the consumable item is entitled to receive a replacement consumable item, a credit, and so on, based on the terms of the warranty in question. If all the terms of the warranty are satisfied, then the consumable item in question is said to be entitled for warranty purposes.

The consumable item may fail entitlement for warranty purposes where the consumable item identifier decoded form the code fails to match the instance of the consumable item identifier received in part 118. The user may have caused the code to be generated in relation to a consumable item other than the one which he is submitting for return under warranty. In this situation, the consumable item that has been presented for return is not entitled for warranty purposes. It is noted that these two instances of the consumable item identifier need not be identical to one another in one embodiment of the invention, so long as the decoded consumable item identifier sufficiently maps to the instance of the consumable item identifier received in part 118 for warranty entitlement purposes.

The consumable item may also fail entitlement for warranty purposes where the number of times consumable items have been used in the image-forming device identified by the image-forming device identifier is greater than a predetermined number of times within a predetermined period. That is, it may be determined that over one-hundred (as one threshold) consumable items have been previously returned within the previous two months (as one threshold), where all these consumable items have been used within the same image-forming device. On this basis, the consumable item that is the subject of the method 100 may not be entitled for warranty purposes, due to excessive returns originating from the same image-forming device.

The consumable item may further fail entitlement for warranty purposes where the date when the code was generated is more than a predetermined number of days before the current date. The user may have caused the code to be generated when he or she first installed or inserted the consumable item in question into the image-forming device. Several months later (as one threshold), the user may then have decided to try to return the consumable item under warranty. However, if the code was generated more than a predetermined number of days ago, then the consumable item in question may not be entitled for warranty purposes, due to stale usage or other information.

The consumable item may also fail entitlement for warranty purposes where the usage information indicates that the consumable item has been used to form images on more than a predetermined number of sheets of media. The terms of the warranty may specify that the user has to return the consumable item after forming images on no more than a relatively low number of media sheets, such as 100. If the usage information indicates that the user has exceeded this number with the consumable item in question, then the consumable item may not be entitled for warranty purposes.

The consumable item may further fail entitlement for warranty purposes where the user information indicates that the rated life of the consumable life has been exceeded. For example, a toner cartridge may have a number of rollers that are specified as having a rated life of 1,000,000 media sheets. If the usage information indicates that these rollers are excessively worn, such that or otherwise that they have exceeded their rated life, then the consumable item may not be entitled for warranty purposes. For instance, the user may have been refilling the consumable item him or herself with ink, toner, or another consumable material, in contradistinction to the terms of the warranty, such that the user is now fraudulently attempting to return the consumable item to receive a replacement.

In one embodiment, where the consumable item does not fail entitlement for warranty purposes in any of these ways, then it is said and concluded that the consumable item is entitled for warranty purposes. The second computer program outputs whether the consumable item should be (i.e., has been) entitled for warranty purposes (124), based on the determination made in part 122. Such output can include displaying on a display device of the computing device on which the second computer program is being executed whether or not the consumable item has been determined to be entitled for warranty purposes, or printing this information on an image-forming device. Using this information, a worker at the return center to which the consumable item has been returned can appropriately process the consumable item as being under warranty, or as not being under warranty for entitlement failure. Furthermore, in one embodiment, such output can include prorating the warranty based on one or more factors such as the amount of consumable material remaining in the consumable item, the length of life of the consumable item remaining, the time since initial installation of the consumable item, and so on.

Figure 2:
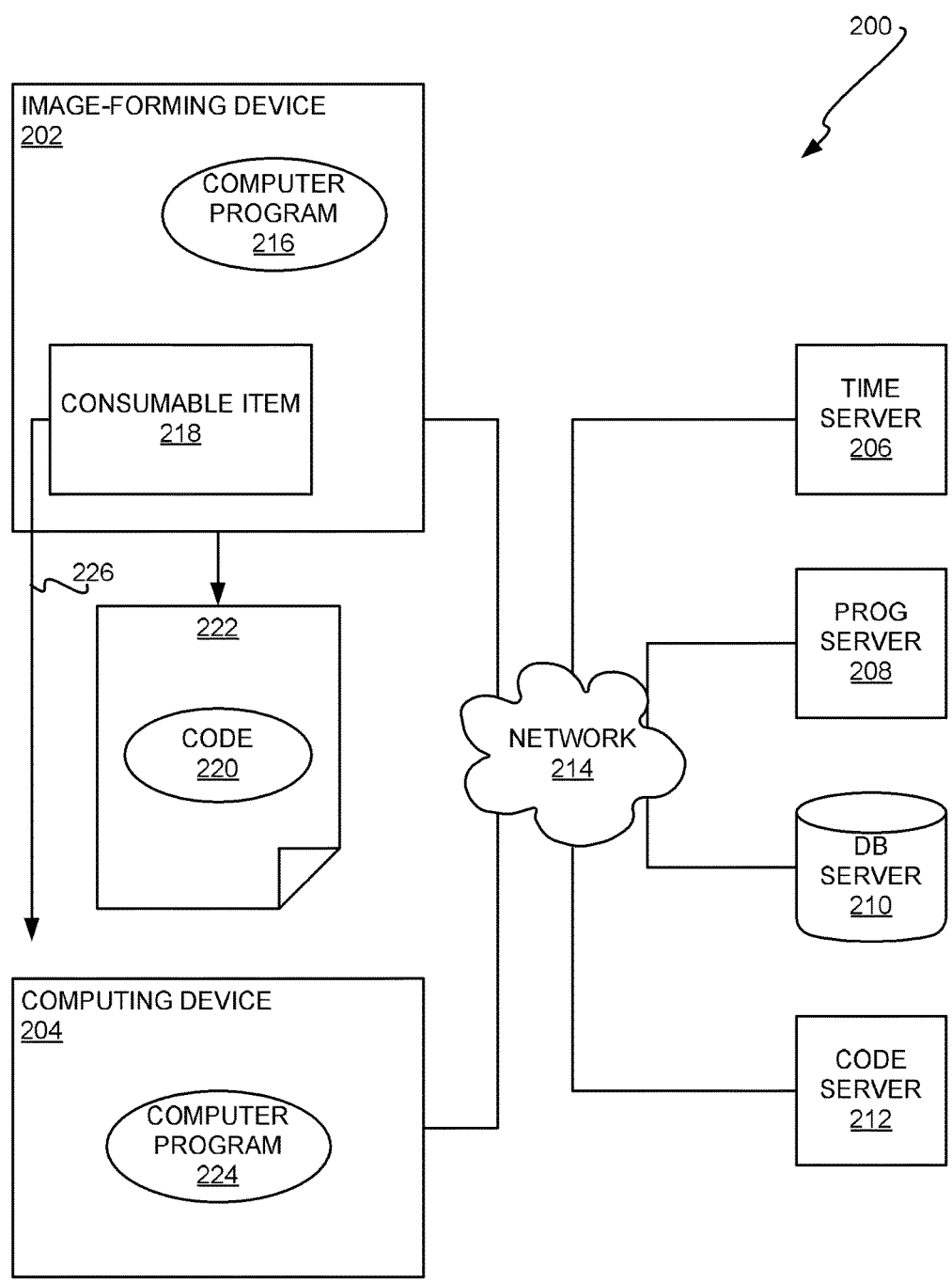
FIG. 2 is a diagram of a system in relation to which a warranty entitlement process for an image-forming device consumable item can be performed, according to an embodiment of the present disclosure.

FIG. 2 shows a system 200 in relation to which the method 100 can be performed, according to an embodiment of the present disclosure. The system 200 includes at least an image-forming device 202 and a computing device 204. The image-forming device 202 is typically located at an end user's location at which the user uses the image-forming device 202, in which a consumable item 218 has been inserted or installed, for forming images on media. The image-forming device 202 itself may be connected to a computing device from which the device 202 receives data to be formed as images on media, but such a computing device is not depicted in FIG. 2 for illustrative convenience. By comparison, the computing device 204 is typically located at a location at which warranty returns of consumable items are received and/or processed by or for the manufacturer of the consumable items.

The system 200 may also include a network 214 to which the image-forming device 202 and/or the computing device 204 are communicatively connected. The network 214 may be or include one or more of: the Internet, intranets, extranets, wired networks, wireless networks, local-area networks (LAN's), and wide-area networks (WAN's), among other types of networks. The system 200 may further include one or more of: a time server 206, a program server 208, a database server 210, and a code server 212, each of which may also be communicatively connected to the network 214. It is noted that while the servers 206, 208, 210, and 212 are depicted as discrete servers in FIG. 2, in one embodiment, one or more the servers 206, 208, 210, and 212 may have their respective functionalities combined in a single computing device, such as a single server, as can be appreciated by those of ordinary skill within the art.

The image-forming device 202 includes a first computer program 216. The first computer program 216 may be pre-installed within the image-forming device 202, so that it is available for execution at the time of shipment for purchase and/or use by the user. Alternatively, the first computer program 216 may be downloaded from the program server 208 when the user wants to initiate the warranty return process of the consumable item 218.

The first computer program 216 performs the functionality ascribed to the first computer program in the method 100. As such, the first computer program 216 retrieves usage information regarding the consumable item 218, and the consumable item identifier, from a memory of the consumable item 218, which is installed or inserted into the image-forming device 202. The first computer program 216 may receive the current date from an internal time clock of the image-forming device 202, from a time click of a computing device to which the device 202 is connected, and/or from the time server 206. The first computer program 216 also retrieves the image-forming device identifier of the image-forming device 202 itself.

The first computer program 216 generates the code 220 as has been described. In one embodiment, the first computer program 216 causes the image-forming device 202 to form an image on a media sheet 222, where the code 220 is part of this image. In another embodiment, the first computer program 216 may transmit the code 220 to the code server 212 to which the image-forming device 202 is communicatively connected via the network 214.

The computing device 204 includes a second computer program 224. The second computer program 224 may also be pre-installed, or it may be downloaded from the program server 208. The second computer program 224 receives the code 220 upon the user initiating the warranty return process of the consumable item 218, where such initiation is indicated by an arrow 226 in FIG. 2. The second computer program 224 may, for instance, optically scan the image formed on the media sheet 222 to receive the code 220, or it may receive the code 220 from the code server 212 to which the code 220 has been transmitted by the first computer program 216.

The second computer program 224 thus performs the functionality ascribed to the second computer program in the method 100. As such, the second computer program 224 decodes the consumable item identifier, the date at which the code was generated, the usage information regarding the consumable item 218, and/or the image-forming device identifier, from the code 220. In one embodiment, the second computer program 224 may send the date and the image-forming device identifier, where the latter is present, to the database server 210 over the network 214, so that a database maintained by the database server 210 can be updated, as has been described.

The second computer program 224, based on the information decoded from the code 220, determines whether the consumable item 218 should be entitled for warranty purposes, as has also been described. The second computer program 224 outputs the results of this determination. For example, the second computer program 224 may provide a hardcopy of this determination, using an image-forming device to which the computing device 204 is communicatively connected, and which is not depicted in FIG. 2 for illustrative convenience. As another example, the second computer program 224 may display this determination on a display device of the computing device 204.

It is noted that both the computer program 216 and the computer program 224 may be stored on a computer-readable medium. Examples of such computer-readable medium include volatile and non-volatile memory, semiconductor memory like dynamic random-access memory (DRAM), magnetic media like hard disk drives, and/or optical media such as compact disc read-only memory (CD-ROM) discs and digital versatile discs (DVD's). The computer program 216 and/or the computer program 224 may be stored on other types of computer-readable media as well.

Figure 3:
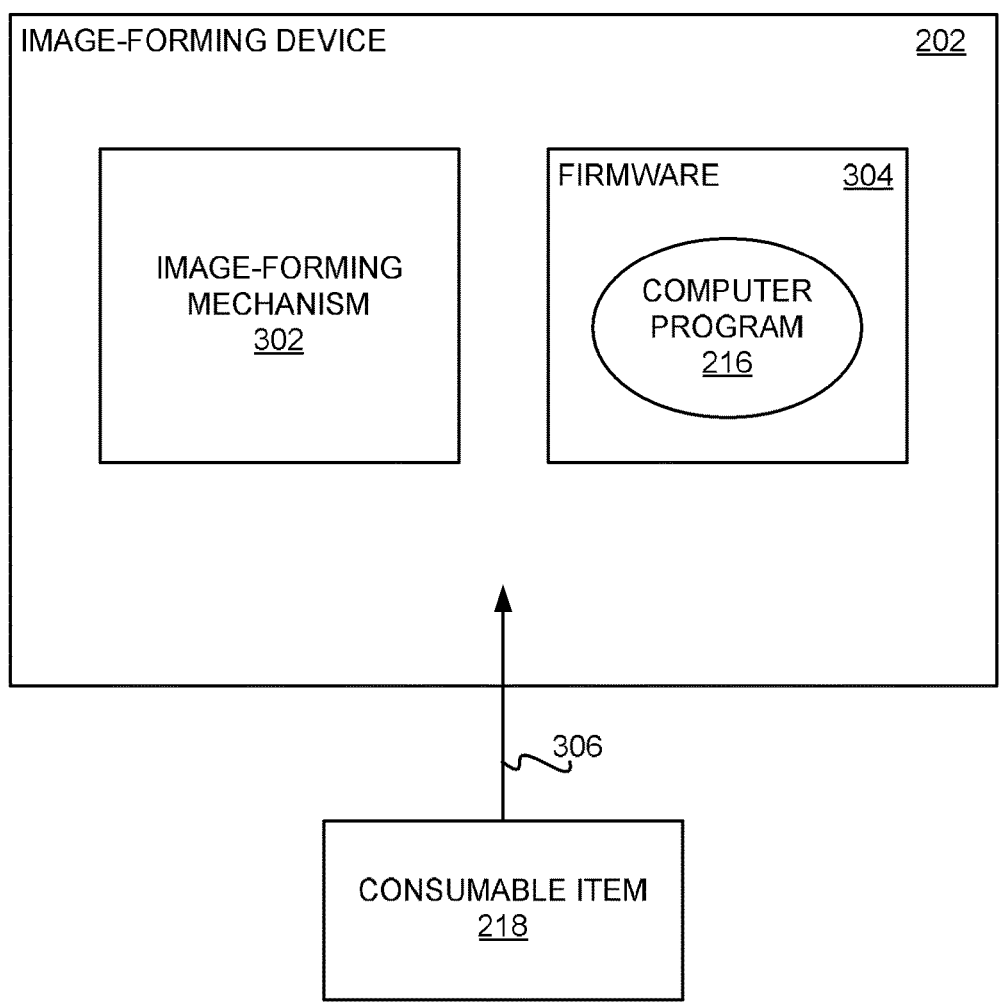
FIG. 3 is a rudimentary block diagram of an image-forming device, according to an embodiment of the present disclosure.

FIG. 3 shows a rudimentary block diagram of the image-forming device 202, according to an embodiment of the invention. The image-forming device 202 is depicted in FIG. 3 as including an image-forming mechanism 302 and firmware 304. Those of ordinary skill within the art can appreciate that the image-forming device 202 can include other components, in addition to and/or in lieu of the image-forming mechanism 302 and the firmware 304. In addition, the image-forming device 202 is receptive to installation or insertion of the consumable item 218, as indicated by the arrow 306.

The image-forming mechanism 302 may be a laser-printing mechanism where the image-forming device 202 is a laser-printing device, an inkjet-printing mechanism where the device 202 is an inkjet-printing device, or another type of image-forming mechanism. Where the image-forming mechanism 302 is a laser-printing mechanism, the consumable item 218 may be a toner cartridge. Where the image-forming mechanism 302 is an inkjet-printing mechanism, the consumable item 218 may be an inkjet cartridge.

The firmware 304 includes one or more computer programs, including the first computer program 216, that are typically stored in non-volatile memory. As such, the first computer program 216 may be shipped for purchased and/or usage by the user with the computer program 216 already stored within the firmware 304. As another example, the first computer program 216 may be downloaded into the firmware 304 from a computing device over a network, such as from the program server 208 over the network 214, when the code 220 is to be generated.

I claim:

1. A method comprising:
    by a first computer program, generating a code encoding a date when the code was generated, an at least substantially unique identifier of a consumable item for an image-forming device, and usage information regarding the consumable item, including:
        retrieving a current date from a computing device over a network and setting the date when the code was generated is set to the current date retrieved, the computing device being a time server that is not under control of a user; and
        generating the code in a cryptographic manner decreasing user ability to determine the at least substantially unique identifier and the usage information encoded in the code from inspection of the code,
        the at least substantially unique identifier and the usage information retrieved from a memory of the consumable item;
    upon the user returning the consumable item for warranty purposes,
        by a second computer program,
            decoding the code to obtain the date, the at least substantially unique identifier, and the usage information;
            determining whether to entitle the consumable item for warranty purposes based on the date, the at least substantially unique identifier, and the usage information, including ensuring that the usage information is not stale by comparing a current date to the date when the code was generated; and,
            outputting whether the consumable item should be entitled for warranty purposes,
    wherein the method improves forgery and tampering resistance of the code between a time when the code is generated by the first computer program and a time when the code is decoded by the second computer program.

2. The method of claim 1, further comprising downloading the first computer program into the image-forming device from a computing device over a network, the image-forming device executing the first computer program.

3. The method of claim 1, further comprising, by the first computer program, retrieving the at least substantially unique identifier and the usage information from the memory of the consumable item.

4. The method of claim 1, further comprising:
    by the first computer program, forming an image on a media sheet using the consumable item, the image including the code; and,
    by the second computer program, receiving the code by scanning the image formed on the media sheet and that includes the code.

5. The method of claim 1, further comprising:
by the first computer program, transmitting the code to a computing device over a network; and,
by the second computer program, receiving the code from the computing device over the network.

6. The method of claim 1, wherein:
the at least substantially unique identifier of the consumable item is a substantially unique first identifier of the consumable item;
the method further comprises, by the second computer program, receiving an at least substantially unique second identifier of the consumable item imprinted on the consumable item; and,
determining whether to entitle the consumable item for warranty purposes comprises failing entitlement of the consumable item for warranty purposes where the substantially unique first identifier fails to match the substantially unique second identifier.

7. The method of claim 1, wherein:
the code further encodes an at least substantially unique identifier of the image-forming device, the image-forming device executing the first computer program;
decoding the code is further to obtain the at least substantially unique identifier of the image-forming device;
the method further comprises updating a database with an entry corresponding to the date and the at least substantially unique identifier of the image-forming device; and,
determining whether to entitle the consumable item for warranty purposes is further based on the at least substantially unique identifier of the image-forming device, such that entitlement of the consumable item for warranty purposes is failed where a number of times consumable items that have been used in the image-forming device have been returned for warranty purposes is greater than a predetermined number of times within a predetermined period.

8. The method of claim 1, wherein the first computer program is executed by the image-forming device.

9. The method of claim 1, wherein the at least substantially unique identifier of the consumable item is a serial number of the consumable item.

10. The method of claim 1, wherein the at least substantially unique identifier of the consumable item is a lot number reflecting where and when the consumable item was manufactured.

11. The method of claim 1, wherein determining whether to entitle the consumable item for warranty purposes comprises failing entitlement of the consumable item for warranty purposes where the usage information indicates that the consumable item has been used to form images on more than a predetermined number sheets of media.

12. The method of claim 1, wherein determining whether to entitle the consumable item for warranty purposes comprises failing entitlement of the consumable item for warranty purposes where the usage information indicates that that a rated life of the consumable item has been exceeded.

13. A non-transitory computer-readable medium having a second computer program stored thereon to perform a method comprising:
receiving a code generated by a first computer program, the first computer program executed by an image-forming device in which a consumable item has been inserted, the code generated by:
retrieving a current date from a computing device over a network and setting a date when the code was generated is set to the current date retrieved, the computing device being a time server that is not under control of the user; and
generating the code in a cryptographic manner decreasing user ability to determine an at least substantially unique identifier and usage information encoded in the code from inspection of the code;
decoding the code to obtain the date when the code was generated, the at least substantially unique identifier of the consumable item, and the usage information regarding the consumable item;
determining whether to entitle the consumable item for warranty purposes based on the date, the at least substantially unique identifier, and the usage information, including ensuring that the usage information is not stale by comparing a current date to the date when the code was generated; and,
outputting whether the consumable item should be entitled for warranty purposes,
wherein the method improves forgery and tampering resistance of the code between a time when the code is generated by the first computer program and a time when the code is decoded by the second computer program,
wherein the image-forming device is a standalone printer or an all-in-one (AIO) printing device.

14. The computer-readable medium of claim 13, wherein receiving the code generated by the other computer program comprises one of:
scanning an image formed on a media sheet by the image-forming device with the consumable item, the image including the code; and,
receiving the code from a computing device over a network, the other computer program having transmitted the code to the computing device over the network.

15. The computer-readable medium of claim 13, wherein:
decoding the code is further to obtain an at least substantially unique identifier of the image forming device;
the method further comprises updating a database with an entry corresponding to the date and the at least substantially unique identifier of the image-forming device; and,
determining whether to entitle the consumable item for warranty purposes is further based on the at least substantially unique identifier of the image-forming device.

* * * * *

UNITED STATES PATENT AND TRADEMARK OFFICE
CERTIFICATE OF CORRECTION

PATENT NO. : 10,295,946 B2
APPLICATION NO. : 11/831811
DATED : May 21, 2019
INVENTOR(S) : Testardi Page 1 of 1

It is certified that error appears in the above-identified patent and that said Letters Patent is hereby corrected as shown below:

In the Claims

In Column 9, Line 58, Claim 12, after "indicates that" delete "that".

Signed and Sealed this
Thirtieth Day of July, 2019

Andrei Iancu
*Director of the United States Patent and Trademark Office*